United States Patent [19]

Nagata

[11] Patent Number: 4,744,607
[45] Date of Patent: May 17, 1988

[54] BRAKE CONTROL SYSTEM FOR COMBINING ELECTRIC AND FLUID PRESSURE BRAKES

[75] Inventor: Kazutaka Nagata, Tarumi, Japan

[73] Assignee: Nippon Air Brake Co., Ltd., Kobe, Japan

[21] Appl. No.: 919,405

[22] Filed: Oct. 16, 1986

[30] Foreign Application Priority Data

Dec. 18, 1985 [JP] Japan ................ 60-286173

[51] Int. Cl.$^4$ ............................. B60T 13/66
[52] U.S. Cl. ................................ 303/16; 303/3
[58] Field of Search ........... 303/3, 15, 16, 20, 22 R; 318/370, 371

[56] References Cited

U.S. PATENT DOCUMENTS 4,598,953  7/1986  Wood et al. ................. 303/3

FOREIGN PATENT DOCUMENTS 31162  7/1985  Japan .
166671  11/1985  Japan .

Primary Examiner—Duane A. Reger
Attorney, Agent, or Firm—G. J. Falce

[57] ABSTRACT

A railway car braking system employing a pneumatic brake to supplement the primary electric brake is provided with a feedback signal corresponding to the effectiveness of the electric brake. This feedback signal is compared with the brake command signal to derive a deficiency signal, in accordance with which the pneumatic brake is applied. A detector senses a change in the deficiency signal in decreasing sense for applying a correction factor to the deficiency signal, thereby compensating for hysteresis typically associated with the various valves in the pneumatic brake system, in order to obtain consistent pneumatic braking for a given deficiency signal during both an increase and a decrease of the pneumtic braking level.

11 Claims, 2 Drawing Sheets

FIG. 4
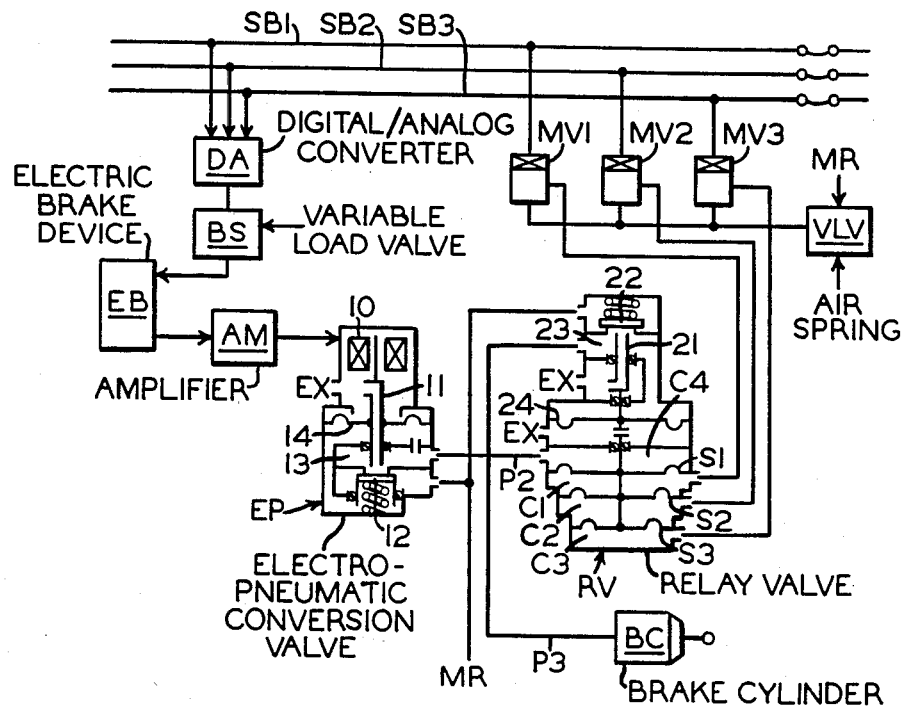
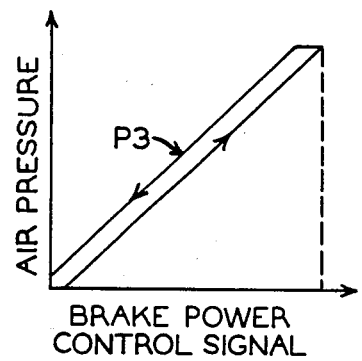
FIG. 5
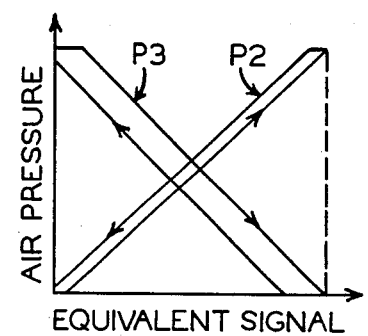
FIG. 6

BRAKE CONTROL SYSTEM FOR COMBINING ELECTRIC AND FLUID PRESSURE BRAKES

BACKGROUND OF THE INVENTION

This invention is concerned with a signal control system for railroad car brakes in which the following technique is used. The electric brake power control signal is converted into a first air pressure. At the same time, the effective electric brake equivalent signal, which corresponds to the actual electric brake power, is converted into a second air pressure. The air brake is controlled according to the difference between the first air pressure and the second air pressure, which is indicative of the insufficiency of the electric brake.

In this brake control technique for railroad cars, the present system features the following: The insufficiency signal is obtained by subtracting the effective electric brake equivalent signal from the brake power control signal. The variation in this insufficiency signal is detected. When it decreases, a correction signal is added to the equivalent signal.

The present invention is suitable for use in a system for controlling the air brake for railroad cars where both air brakes and electric brakes are used. The air brake provides braking power to supplement the electric brake power when sufficient electric brake power is not obtained for a certain brake power control signal. Such a system is known from the official Japanese patent applications Nos. 60-31162 and 60-166671, and is well known.

In the known arrangement shown in FIG. 4, SB1, SB2, and SB3 denote electrical leads which transmit electric brake power control signals to each control device of a railroad car. The signal consists of three-bit digital data.

Compressed air is supplied to the magnetic valves MV1, MV2, and MV3 from the compressed air supply MR and the variable load valve VLV which is connected to the air spring. The pressure is adjusted according to the car load. These magnetic valves are activated or deactivated (opened or closed) according to the aforementioned brake power control signal, supplying or draining compressed air to/from the relay valve RV which will be described later.

At the same time the brake power control signal is converted into an analog signal by the digital analog converter DA. The brake power setting device BS adds a load signal to the above converted signal according to the car load. The resultant signal is transmitted to the electric brake device EB.

This electric brake device EB works following the above brake power control signal, giving electric brake power to the car.

The effective electric brake equivalent signal, which corresponds to the actual electric brake power, is transmitted to the electro-pressure conversion valve EP through the amplifier AM.

The electro-pressure conversion valve works in the following way: When the colenoid 10 is activated, the pull on the supply exhaust valve control rod 11 opens the supply valve 12. The balance position 14 is pushed up due to the increase of air pressure in the output space 13. When the forces on the two sides of the balance piston 14 are equal, the supply exhaust valve control rod 11 and the supply valve 12 will change to the lap state and the pressure in the output space 13 will be maintained. The compressed air in this output space 13 is supplied to or exhausted from the relay valve RV.

In the relay valve RV, the compressed air supplied to the diaphragm spaces C1, C2, and C3 through the magnetic valves MV1, MV2, and MV3 works to push up the supply exhaust valve control rod 21 through corresponding diaphragm pistons S1, S2, and S3. In contrast, the compressed air supplied to the diaphragm space C4 through the electro-pressure conversion valve EP works in the opposite direction.

In short, the brake power control signal is converted into the first air pressure by the diaphragm spaces C1, C2, and C3, the diaphragm pistons S1, S2, and S3 in the relay valve RV, and the magnetic valves MV1, MV2, and MV3. The output pressure of the electro-pneumatic conversion valve EP is the second air pressure which is converted from the equivalent signal. This second air pressure is subtracted from the first air pressure in the relay valve RV.

When the electric brake power is not sufficient for the given brake power control signal, the supply-exhaust valve 21 opens the supply valve 22 in the relay valve RV. Air pressure in the output space 23 increases. This pressure pushes down the balancing piston 24 until the forces on both sides of the balancing piston 24 are equal. In this condition, the supply/exhaust valve control rod 21 and the supply valve 22 are in lap state and the pressure in the output space 23 will be maintained. This output pressure is applied to the brake cylinder BC which is part of the air brake device.

In summary, the subtraction of the second air pressure from the first air pressure is achieved in the relay valve RV. The air brake device is controlled following the result of the subtraction.

The following problems are pointed out for the conventional air brake control system described above.

The first problem arises when the electric brake device EB fails to respond to the given brake power control signal, giving the equivalent signal of zero. In other words, when electric braking power is absent and the air brake power is supplying all the brake poweor to the car, the pressure in the brake cylinder P3 is controlled with the electric valves MV1, MV2, MV3, and the relay valve RV. In this case, as shown in FIG. 5, the brake cylinder pressure P3 becomes higher for a decreasing brake power control signal than for an increasing signal due to the hysteresis which is caused by the friction in the relay valve RV and other effects. As a result, the total brake power is different from the case where the electric brake device EB works with full efficiency. This means that one cannot get consistent brake power for the same brake power control signals. Not only does the consistency in the stopping distance of the train suffer, but the ride will become uncomfortable for the passengers because of the uneven cooperation of the electric brakes with the air brakes. Secondly, when the air brake supplements the electric brake for the insufficient power for a brake power control signal, a similar problem also occurs. When the total brake load is shared by the electric brake power and the air brake power, the electro-pressure conversion valve EP is also activated by the equivalent signal which corresponds to the actual electric brake power. Hysteresis in the output pressure P2 also occurs in the electro-pressure conversion valve EP due to friction and other effects. This hysteresis is added to the hysteresis in the relay valve RV. As shown in FIG. 6, the hysteresis of the brake cylinder pressure P3 is even larger in this case.

BRIEF SUMMARY OF THE INVENTION

It is the object of the present invention to counteract the above-discussed hysteresis in order to achieve a greater level of precision in the transition between the electric and pneumatic brake system and thereby provide better passenger comfort.

The solution adopted in the present invention to achieve the foregoing objective is to subtract the equivalent signal from the brake power control signal to obtain the insufficiency signal. The variation in the insufficiency signal is detected. When the detected result indicates a decreased insufficiency signal, a correction signal is added to the above equivalent signal to correct the equivalent signal.

DESCRIPTION AND OPERATION

This and other objects and advantages of the invention will become apparent from the following more detailed explanation when taken in connection with the accompanying drawings in which:

FIG. 4 is a diagrammatic drawing showing an example of a known brake control system absent of the present invention; and FIGS. 5 and 6 are characteristic curves representing various air pressures occurring in the known brake control system of FIG. 4.

When the total brake power is supplied entirely by the air brake, the equivalent signal is zero. Therefore, the insufficiency signal is equal to the brake power control signal. Its decrease will cause a corrective signal to be added to the equivalent signal creating effectively a non-zero equivalent signal. The second air pressure converted from the effective equivalent signal is subtracted from the first air pressure. The resulting differential pressure is thus smaller than that under the zero equivalent signal. This makes it possible to get the same differential pressure when the insufficiency signal decreases compared with the result when this signal increases.

Similarly, when the air brake supplies part of the total brake power, the correction signal is added to the equivalent signal if the insufficiency signal decreases. This results in a larger effective equivalent signal. The second air pressure converted from this signal is subtracted from the first air pressure. Thus, it becomes possible to get the same differential pressure when the insufficiency signal decreases compared with that under the increasing insufficiency signal.

Figure 1:
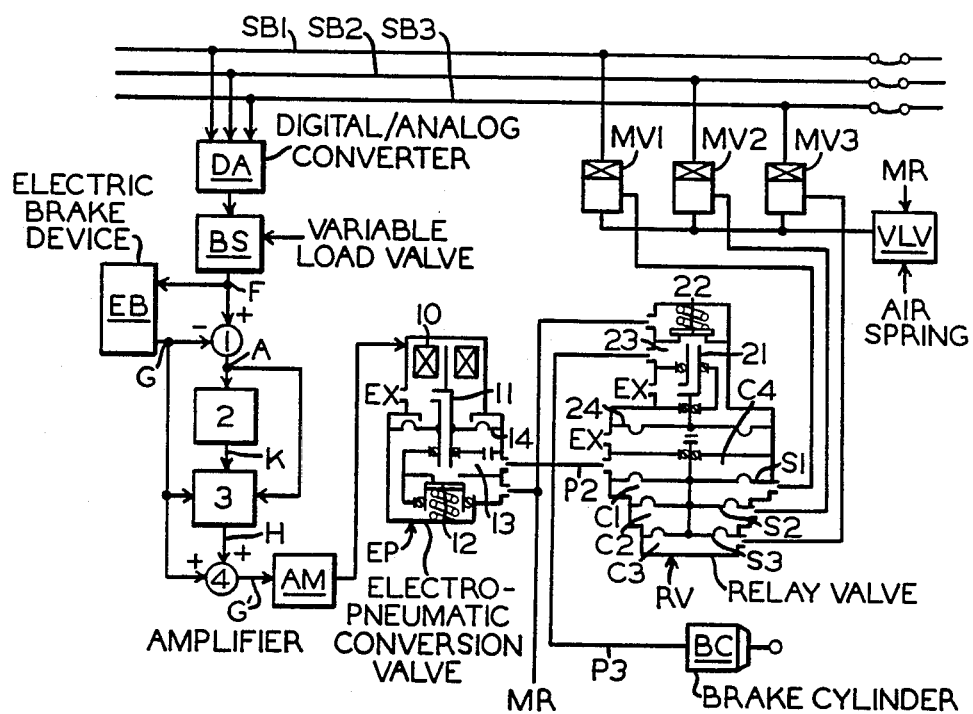
FIG. 1 is a diagrammatic drawing showing one example of a known brake control system modified according to the present invention.

In FIG. 1, 1 denotes the differential comparator device which obtains the insufficiency signal A by subtracting the equivalent signal G from the brake power control signal F. 2 indicates the detector which detects variation of the insufficiency signal. When the variation is detected in a decreasing sense, the device produces a detection signal K. The correction signal setter is shown as 3. This device generates a preset correction signal H when the detection signal K is received at the input. 4 denotes the adding device which produces a corrected equivalent signal G', adding the correction signal H to the equivalent signal G.

If the electric brake device EB fails to respond to the brake power control signal F, the equivalent signal G is zero. As a result, the insufficiency signal A is equal to F. When A decreases, the detection signal K is produced. When the equivalent signal G is zero, the correction signal H has a first value H1. The corrected equivalent signal G' will be equal to H1. This corrected equivalent Signal G' is transmitted to the electro-pressure conversion valve EP through the amplifier AM. The second pressure, which is the output of the electro-pressure conversion valve EP corresponds to the correction signal H1. This pressure is subtracted from the first pressure at the relay valve RV. Being the output of the relay valve RV, the pressure in the brake cylinder P3 is now smaller than in the conventional method by the amount corresponding to the correction signal H1.

Figure 2:
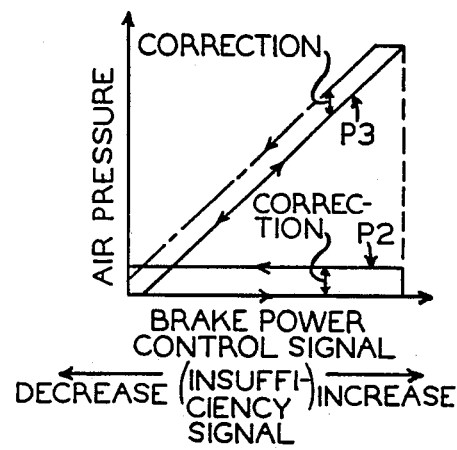
FIGS. 2 and 3 are characteristic curves representing air pressure signals as exist prior to and following correction thereof in accordance with the present invention.

In the above case where the air brake supplies the total brake power, no correction is made when the insufficiency signal or the brake power control signal increases. As a result, the brake cylinder pressure P3 increases in the same way as in the conventional method. This is shown in FIG. 2. When the brake power control signal decreases, the corrected second pressure, as described above, is subtracted from the first air pressure. The brake cylinder pressure P3 decreases by the amount which corresponds to the correction signal H1. The result is the same pressure as in the case of the increasing brake power control signal. Single dotted broken lines indicate the results with conventional methods.

When the electric brake responds to the brake power control signal, the insufficiency signal A is equal to F-G. Its decrease produces the detection signal K. When the equivalent signal G is larger than zero, i.e., when the equivalent signal G is present, the correction signal H has a second value H2. The equivalent signal G is corrected to be $G' = G + H2$. This equivalent signal is transmitted to the electro-pressure conversion valve EP through the amplifier AM. The second pressure which is the output of the electro-pressure conversion valve is higher than that in the conventional method by the amount corresponding to the second correction signal H2. This pressure is subtracted from the first air pressure. As a result, the brake cylinder pressure P3, which is the output air pressure of the relay valve RV, is lower than that in the conventional method by the amount corresponding to the second correction signal H2.

Figure 3:
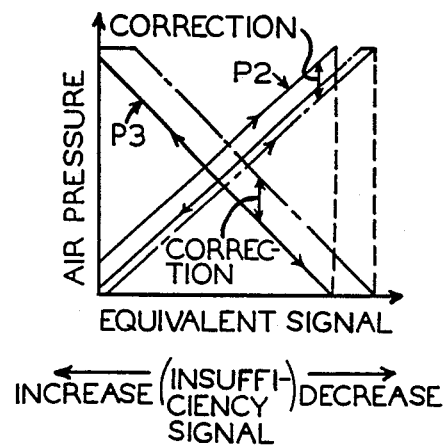

In the above case where the total brake load is shared by the electric brake and the air brake, no correction is made when the insufficiency signal increases or the equivalent signal decreases. The brake cylinder pressure P3 increases as the second pressure P2 decreases. This process is the same as in the conventional method as shown in FIG. 3. When the insufficiency signal or the equivalent signal decreases, the corrected second air prssure P2 is subtracted from the first air pressure as described above.

The brake cylinder pressure P3 decreases by the amount corresponding to the second correction signal H2, resulting in the same pressure as when the insufficiency signal increases (or the equivalent signal decreases). Single dotted broken lines indicate the results with the conventional method.

In this example of the installation, the equivalent signal G is introduced to the correction signal setter 3. Since the equivalent signal G is present at correction signal setter 3, correction signal H2 is chosen to provide the corrected equivalent signal G'. Under certain conditions, it is possible to make the correction signal H constant regardless of the presence or absence of the equivalent signal G. As shown with the single dotted broken lines in FIG. 1, it is also possible to make the correction signal H continuously variable. Introducing the insufficiency signal A to the correctio signal setter 3, the correction signal H is given as $H=f(A)$.

As explained above, when the insufficiency signal or the control signal to the air brake device decreases, a preset correction signal is added to the equivalent signal of the electric brake power signal. The second air pressure increases corresponding to this corrected equivalent signal. This pressure is subtracted from the first air pressure, resulting in decreased pressure corresponding to the above correction signal. This means the same pressure as in the increasing insufficiency signal.

As a result, it becomes possible to make the total brake power constant for the following three cases: The air brake supplies the total power; the air brake and the electric brake share the loads; the electric brake supplies the total power. This means nearly regular stopping distance of the train and an improved ride.

I claim:

1. A brake control system for a railway vehicle having an electrical brake system and a fluid pressure brake system, said brake control system comprising:
   (a) means for providing a brake power control signal according to the desired total braking power of said vehicle;
   (b) said electric brake system being operative in response to said brake power control signal to provide vehicle braking power;
   (c) means for providing an equivalent signal according to the effective vehicle braking power provided by said electric brake system;
   (d) detector means for determining only when the difference between said brake power control signal and said equivalent signal changes in a decreasing sense to thereby provide a modified equivalent signal; and
   (e) said fluid pressure brake system being operative to provide additional vehicle braking power in accordance with the difference between said brake power control signal and said modified equivalent signal to supplement said braking power provided by said electric brake system.

2. A brake control system as recited in claim 1, wherein said detector means is operative to modify said equivalent signal by a preset value.

3. A brake control system as recited in claim 1, wherein said detector means is operative to modify said equivalent signal by a first preset value when said equivalent signal is zero and by a second preset value when said equivalent signal is greater than zero.

4. A brake control system as recited in claim 3, wherein said first preset value is less than said second preset value.

5. A brake control system as recited in claim 1, wherein said detector means is operative to modify said equivalent signal by a variable value.

6. A brake control system as recited in claim 1, wherein said modified equivalent signal is greater than said equivalent signal.

7. A brake control signal as recited in claim 6, wherein said detector means comprises:
   (a) a signal comparator having a first input subject to said brake power control signal, a second input subject to said equivalent signal, and an output providing an insufficiency signal when said equivalent signal is less than said brake power control signal;
   (b) a signal detector having an input subject to said insufficiency signal and an output providing a detect signal when said insufficiency signal changes in a decreasing sense;
   (c) a correction setter having a first input subject to said detect signal and an output providing a correction signal when said detect signal occurs; and
   (d) a signal adder having a first input subject to said equivalent signal; a second input subject to said correction signal and an output providing said modified equivalent signal according to the sum of said equivalent signal and said correction signal.

8. A brake control system as recited in claim 7, wherein said correction signal is a preset value.

9. A brake control system as recited in claim 7, wherein said correction setter further includes a second input subject to said equivalent signal, whereby said correction signal is a first preset value when said equivalent signal is absent and said correction signal is a second preset value when said equivalent signal is present.

10. A brake control signal as recited in claim 9, wherein said first preset value is less than said second preset value.

11. A brake control system as recited in claim 9, wherein said correction setter further includes a second input subject to said insufficiency signal, whereby said correction signal varies according to the value of said insufficiency signal.

* * * * *

UNITED STATES PATENT AND TRADEMARK OFFICE
CERTIFICATE OF CORRECTION

PATENT NO. : 4,744,607

DATED : May 17, 1988

INVENTOR(S) : Kazutaka Nagata

It is certified that error appears in the above-identified patent and that said Letters Patent are hereby corrected as shown below:

Column 6, line 46, delete "9" and insert --7--

Signed and Sealed this

Eighteenth Day of October, 1988

Attest:

DONALD J. QUIGG

Attesting Officer

Commissioner of Patents and Trademarks